United States Patent [19]

Spencer

[11] Patent Number: 5,367,340
[45] Date of Patent: Nov. 22, 1994

[54] APPARATUS AND METHOD FOR NOISE REDUCTION OF VIDEO SIGNAL DEPENDENT UPON VIDEO GAIN

[75] Inventor: Simon H. Spencer, Essex, United Kingdom

[73] Assignee: GEC-Marconi Limited, Stanmore, United Kingdom

[21] Appl. No.: 776,443

[22] Filed: Oct. 18, 1991

[30] Foreign Application Priority Data

Oct. 19, 1990 [GB] United Kingdom ............... 9022743

[51] Int. Cl.$^5$ .................... H04N 5/21; H04N 5/213
[52] U.S. Cl. .............................. 348/607; 348/241
[58] Field of Search .................. 358/36, 37, 166, 167, 358/168, 169, 174, 164, 213.15, 213.26; H04N 5/21, 5/213

[56] References Cited

U.S. PATENT DOCUMENTS

| | | | |
|---|---|---|---|
| 4,799,106 | 1/1989 | Moore et al. | 358/168 |
| 4,851,911 | 7/1989 | Muller . | |
| 4,901,150 | 2/1990 | Klingelhofer et al. | 358/167 |
| 4,926,261 | 5/1990 | Matsumoto et al. | 358/36 |
| 5,124,786 | 6/1992 | Nikoh | 358/36 |

FOREIGN PATENT DOCUMENTS

| | | |
|---|---|---|
| 0328346 | of 1989 | European Pat. Off. . |
| 0455434 | 11/1991 | European Pat. Off. ....... H04N 5/21 |
| 0122273 | 6/1989 | Japan .................... H04N 5/21 |
| 2092404A | of 1982 | United Kingdom . |
| 2209447A | of 1989 | United Kingdom . |
| 2211692A | of 1989 | United Kingdom . |
| WO91/11887 | 8/1991 | WIPO .................. H04N 9/68 |

Primary Examiner—James J. Groody
Assistant Examiner—Glenton B. Burgess
Attorney, Agent, or Firm—Lowe, Price, LeBlanc & Becker

[57] ABSTRACT

A circuit 8 reduces noise on a video signal from an imager 6 for a TV monitor 7. The noise reduction circuit includes a video frame store connected so as to integrate the corresponding picture elements of several frames in order to reduce noise. The amount of noise reduction applied depends on the noise on the incoming video signal but, whereas this has been assessed previously by comparing differences between incoming frames, in the invention it is assessed from the gain, information on which is encoded on the video signal. The gain of the imager gives a more accurate reflection of video noise than does comparing successive frames, since movements on the image can produce the same effect as noise fluctuations.

20 Claims, 5 Drawing Sheets

APPARATUS AND METHOD FOR NOISE REDUCTION OF VIDEO SIGNAL DEPENDENT UPON VIDEO GAIN

TECHNICAL FIELD

This invention relates to a circuit for noise reduction of the video signal from an imager. The invention is applicable for example to TV surveillance imagers i.e. cameras such as thermal images (e.g. scanned detectors, daylight CCD imagers or intensified CCD imagers).

BACKGROUND ART

It has been proposed to reduce noise on the video signal from an imager by integration of a number of frames using a frame store. For example in one known arrangement (FIG. 1) a frame store 1 is connected in a recursive digital filter arrangement and receives a digitised video input. The digits that are read out of the frame store are delayed by one frame relative to those written in, and so digits representing pixels of any particular line of a given frame appearing at the input have subtracted from them digits representing respective pixels of the corresponding line of the previous frame. This difference signal is fed to a PROM k configured as a look-up table, the output of which may be attenuated compared to the input, and the output of the look-up table is added to the output of the frame store to produce the video output. A manual control enables one of the characteristics shown in FIG. 2 for the PROM k to be selected. The characteristic $k_1$ (k or kernel=1) corresponds to no integration, while the characteristic $k_4$ corresponds to maximum integration. It will be seen that, in case of no integration, the video output is equal to the video input, since the input has the output of the frame store both subtracted from it and added to it. In the case of k=4, corresponding pixels for any line are averaged over a number of rames in the video output. The manual control is adjusted to accommodate different levels of random noise corresponding to different scene conditions. In the case of a noise impulse on a single pixel in a single frame, this will be averaged to a lower and less obtrusive value over several frames. Clearly, however, integration will also have the undesired effect of averaging the position of an object that changes its position between several frames, so-called motion smear, To mitigate such impairment of dynamic resolution, it has been proposed (GB-A-1515551) to make the value of k vary with signal level i.e. noise reduction at level k=4 only takes place when the input to the PROM 2 (the difference between the video input and the video output) is below a certain threshold (FIG. 3): it is assumed that small variations between successive video frames stem from noise while larger variations stem from motion. Consequently, the pixels in a line which were very similar in value to those in that line in previous frames, would be subject to noise reduction, whereas those in a line which differed significantly from those in the same line in preceding frames, would not. However, the threshold needs to be set above the level of fluctuations to the difference signal that is caused by noise, but the level of noise can itself vary.

The applicants considered constructing an adaptive system (FIG. 4) in which several different characteristics (FIG. 5) could be selected dependent on the magnitude of the difference signal (between the output and the input to the noise reduction circuit) and hence dependent on the level of noise (but averaged over many frames). Differences which would correspond to a good signal to noise ratio e.g. better than 39 dB (band a) produce a characteristic A, differences which would correspond to a medium signal to noise ratio lying in the next band b(33 db–39 dB) produce a characteristic B, those in a next band c (27 dB–33 dB) would result in a characteristic C, differences corresponding to a poor signal to noise ratio, worse than 27 dB (band d) would produce characteristic D. The signal resulting from the difference between each new incoming frame and the output of the frame store which would be dependent on the average of several recent frames passes through a rectifier 3 and low pass filter 4 before being converted in an analogue-to-digital converter 5 to one of a number of codes controlling PROM 2. Thus, for example, if the signal to noise ratio lay within band b over several frames, difference signals to PROM 2 below the threshold would be attenuated, those above the threshold would not. If the signal to noise ratio then became worse, the higher threshold of characteristic C would apply.

However, such an arrangement would be prone to error since the measurement of signal to noise ratio would be by comparing successive frames and any change due to motion would make the result inaccurate. For this reason, it has been proposed for the control of noise reduction in a noise reduction circuit to be dependent on the gain of a stage of the imager, which gain is related to the noise generated by the imager (EP-A-0328346 and U.S. Pat. No. 4,851,911).

DISCLOSURE OF THE INVENTION

The invention provides a circuit for the noise reduction of a video signal from an imager, which includes means to control the amount of noise reduction in dependence upon the gain of a stage of the imager for which increase in gain increases the output noise of the imager, the gain being encoded on the video signal.

The invention also provides an imager for generating a video signal having the gain of at least one stage of the imager encoded on the video signal.

Encoding the gain on the video signal permits control at the receiver of noise reduction for a broadcast signal dependent on the noise generated by the imager, and also avoids the need for a separate link to carry the gain signal in a closed circuit system.

To improve the characteristics of the noise reduction circuit, the gain of two or more stages and/or other characteristics of the imager may be encoded on the video signal.

Circuits for the noise reduction of a video signal from an imager constructed in accordance with the invention will now be described by way of example with reference to the accompanying drawings.

BEST MODE FOR CARRYING OUT THE INVENTION

Figure 6:
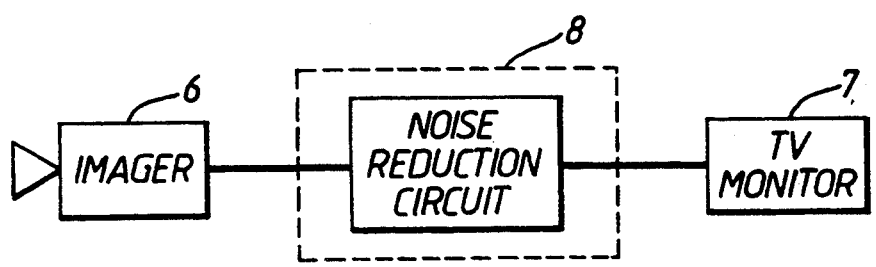
FIG. 6 is a schematic block diagram of a closed circuit television system including the noise reduction circuit.
Figure 9:
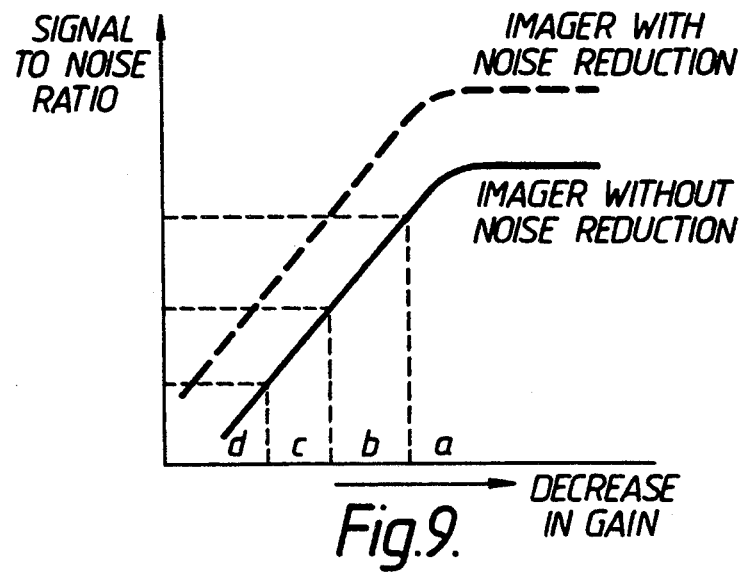
FIG. 9 shows the noise/gain characteristic of the imager.

Referring to FIG. 6, an imager 6 is connected to a TV monitor 7 via a noise reduction circuit 8 in a closed circuit configuration. The imager is a thermal imager of the kind in which a scene is scanned in a raster and successive pixels are imaged onto a detector. The shape of the characteristic of the signal to noise ratio against gain of the thermal imager 6 for a given level of incident radiation is shown in FIG. 9 in full line with the noise reduction circuit disconnected and in dotted line with the noise reduction circuit connected. However, the invention is equally applicable to vidicon, plumbicon, daylight CCD or intensified CCD imagers, which have a similar characteristic to that illustrated.

Figure 10:
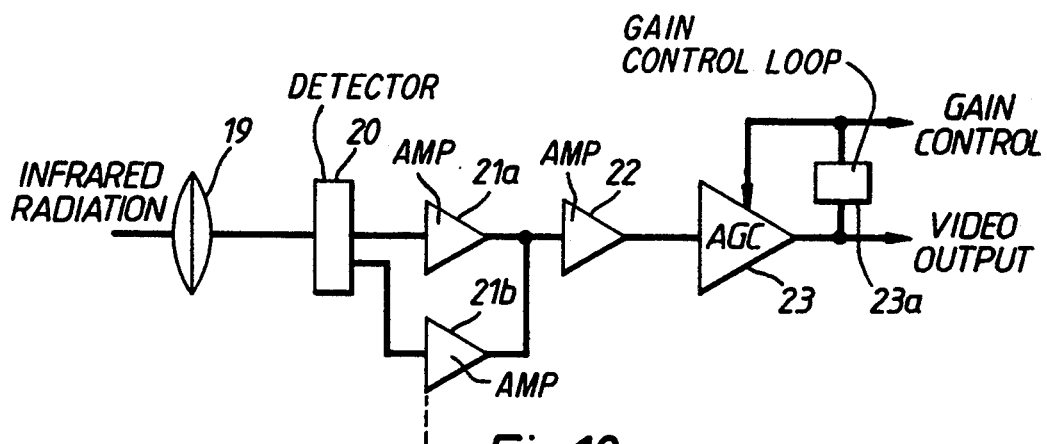
FIG. 10 is a block diagram of the thermal imager.

Referring to FIG. 10, the thermal imager has a fixed iris 19 arranged in front of the detector 20. A scene is scanned over a line by imaging successive elements of the scene in turn onto the detector by means of a rotating mirror polygon. Another mirror tilts to different positions so that the polygon scans the successive lines of a frame. In order to improve the signal to noise ratio of the detector, it includes eight infra-red-sensitive areas, all of which are exposed when producing each pixel of the image, and each such area has a respective amplifier 21a, 21b etc. The outputs of these are combined in an amplifying stage 22, which feeds an automatic gain control (AGC) 23. The gain control loop contains a diode, low pass filter and amplifier (block 23a—similar to the components 29-31 in FIG. 11 described hereinafter). The AGC acts to hold its output constant despite variations in its input. Thus, referring to FIG. 9, when imaging a scene with a wide temperature differential, say 40° C., the output from the detector is high. When imaging a scene with a low temperature differential, say 2° C., the output from the detector is low, and the gain of the AGC increases to maintain the output level. Below saturation level, the gain is linearly related to the noise produced by the detector as shown in FIG. 9 i.e. the noise increases as the gain increases. In this case, the AGC is a measure of the noise dominant stage (i.e. detector) of the imager.

In accordance with the invention, the amount of noise reduction is controlled in accordance with the AGC signal, the smoothed average value of which is sent from imager 6 to noise reduction circuit 8 encoded on the video signal. The noise reduction circuit is shown in more detail in FIG. 7, and the digital noise filter contained in it is shown in more detail in FIG. 8.

Figure 7:
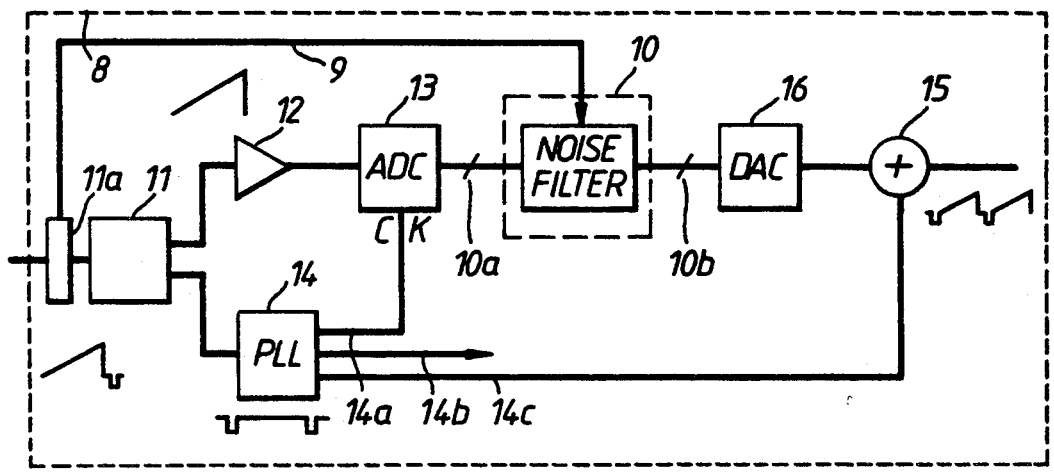
FIG. 7 is a block diagram of the noise reduction circuit.

Referring to FIG. 7, the composite video signal from the imager 6 is divided in a splitter 11 into a separate video (upper branch) and synchronization pulse (lower branch) signals, and a decoder 11a picks off the gain signal and feeds it along link 9 to the digital noise filter 10. The video signal passes through an amplifer 12 which acts as a driver for analogue-to-digital converter 13 which digitises the video signal in preparation for digital noise filter 10. The sync. signals pass to a phase lock loop 14 where clock signals 14a are generated locked to the phase of the sync pulses. Output 14b controls various TV waveforms in TV monitor 7, while sync pulses passing along output 14c are recombined at adder 15 with the noise reduced video signal after it has been reconverted to analogue form by digital-to-analog converter 16. The recombined noise reduced composite video signal is fed to TV monitor 7.

Figure 1:
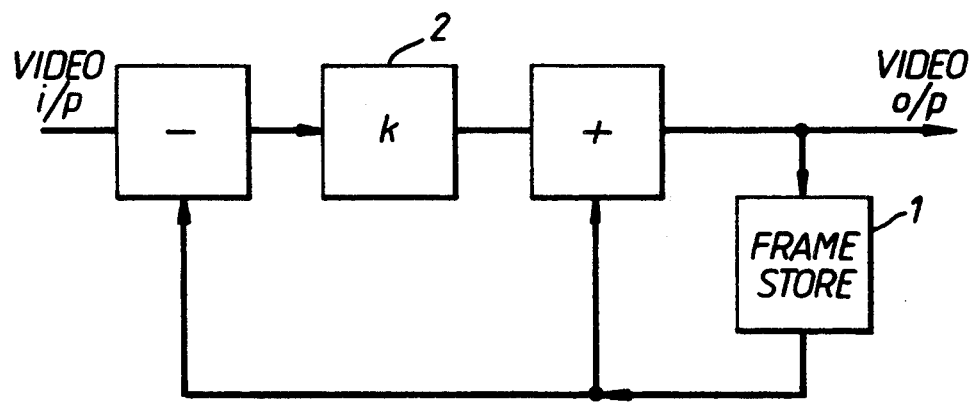
FIG. 1 is a schematic view of a part of one known form of noise reduction circuit.
Figure 2:
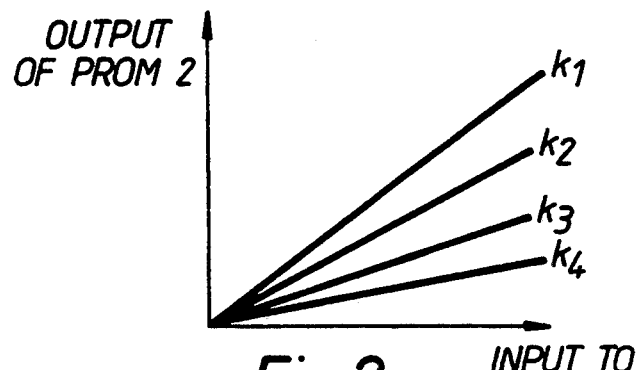
FIG. 2 indicates characteristics for the PROM k of FIG. 1.
Figure 3:
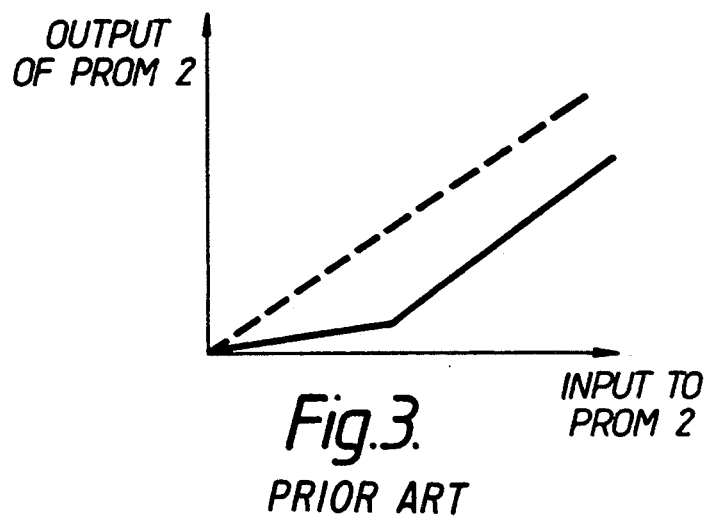
FIG. 3 illustrates the characteristics of the PROM k in a modified form of noise reduction circuit.
Figure 4:
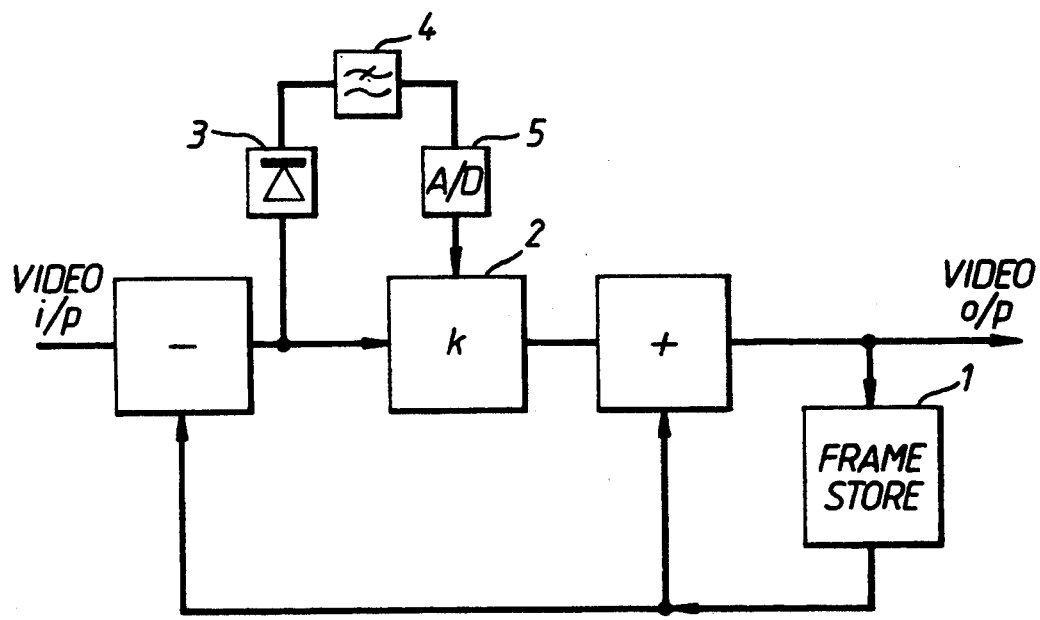
FIG. 4 is a schematic diagram of an adaptive noise reduction system proposed by the applicant.
Figure 5:
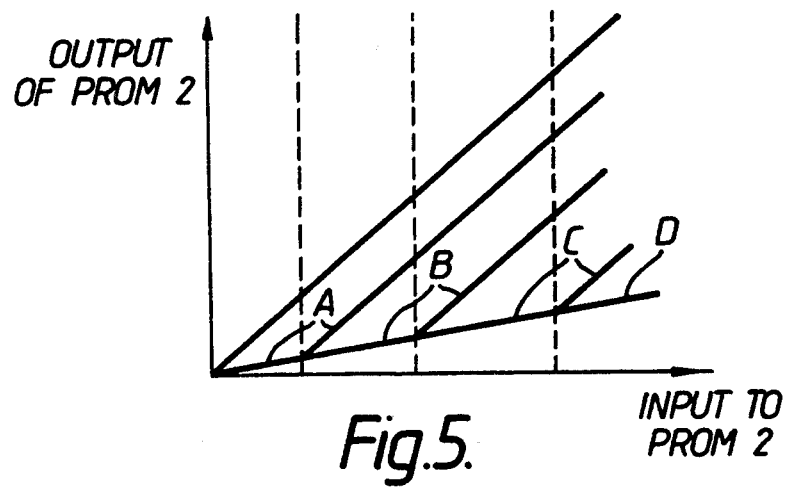
FIG. 5 illustrates the characteristics of the PROM k of FIG. 4.
Figure 8:
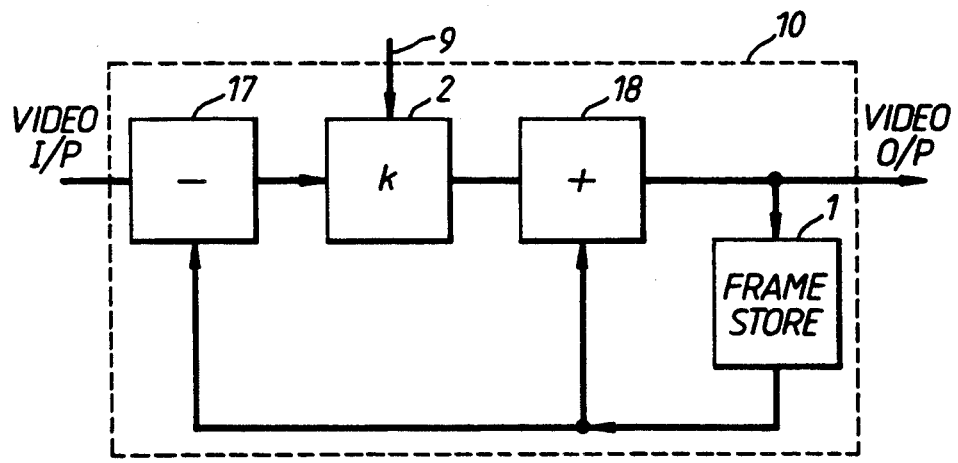
FIG. 8 is a block diagram of a digital filter of the noise reduction circuit.

The digital recursive filter 10 shown in FIG. 8 is the same as that shown in FIG. 4 except that a signal derived from the gain and representative of the noise level is fed into the PROM 2 instead of a code derived from analogue-to-digital converter 5. Samples ar fed along an eight channel bus to component 17 which performs a subtraction operation (this can be made up of an adder together with an inverter in one of its inputs) on a stream of parallel 8-bit samples from analogue-todigital converter 13 together with samples fed out from frame store 1. The latter samples are delayed by one frame period relative to the samples being input into the frame store. The output of the filter is taken from adder 18 which sums the samples fed out of the frame store with those from PROM 2. The PROM 2 can have one of the four characteristics shown in FIG. 5, dependent upon which of the corresponding bands the gain of the imager lies in (FIG. 9). The storage locations addressed by each of the samples being input to the ROM are correspondingly different for each of the bands of gain.

The effect of the recursive filter is to take the average of each pixel over several frames (when on the noise reduction part of the characteristic).

The frame store itself is a pair of integrated circuits configured as a static RAM (i.e. one in which the samples remain in the store after they have been read out), notionally arranged as a 256×256 array. If desired of course, a 512×512 array could be used instead. Each stored pixel can have any one of 256 values on a grey scale. (i.e. 8 bits of quantisation), although it could have less values if desired in which case the number of bus channels could be reduced. A counter addresses the frame store and increments to feed in all the samples of a line, and to start the next line. For convenience a common node is used as input and output i.e. in each clock cycle, the eight bits for one pixel are fed in parallel and the eight bits for the same pixel in the previous frame are fed out. Each integrated circuit stores one of the two interlaced fields of one picture frame. A field store could be used instead of a frame store.

The use of the gain signal to control the amount of noise reduction has the advantage that this is independent of the motion of the picture whereas comparison of successive video frames to assess noise can give inaccurate results in the case of a moving picture. Encoding the gain signal on the video signal avoids the need for a separate link from the imager to the noise reduction circuit apart from the video link.

Although four possible characteristics of noise reduction from PROM 2 dependent on gain bands a-d have been described, it would be possible for many more different characteristics to be provided if desired, one for each band of gain level.

Although the imager described as a thermal imager, gain being defined by the AGC dependent on the thermal window, the imager could be a CCD imager, in which case the gain signal would be derived from the video AGC level, or an intensified CCD imager, in which case the gain would be the intensifier gain and/or the CCD AGC level.

A suitable clocking rate for the ADC and DAC are approximately 10 MHz, and the imager could have 625 lines 50 field a second, and the integrated circuits of the frame stores could each store 300 lines by 600 pixels per line, each 8 bit quantisation.

Figure 11:
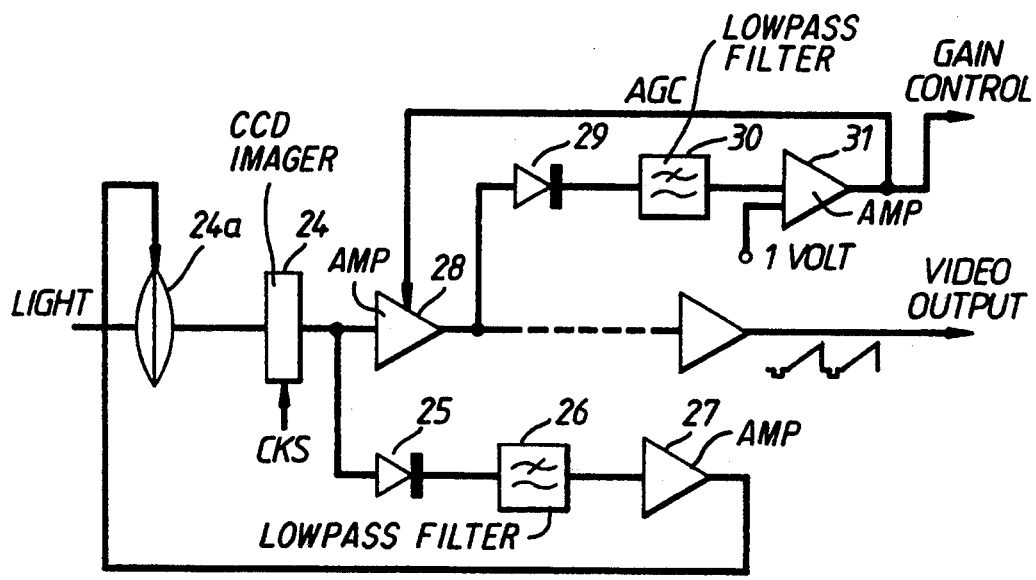
FIGS. 11 and 12 are block diagrams of CCD and ICCD imagers, respectively.

The invention is applicable to the daylight CCD (charge coupled device) imager 24 shown in FIG. 11. The CCD is clocked to produce the video output, and the output is fed to a diode 25, low pass filter 26 and amplifier 27 to an auto-iris mechanism arranged to automatically set the iris 24a to half saturation level of the CCD elements. Thus, if the incoming light level falls, the video output falls, and the signal to the auto-iris falls, causing the iris to open. Naturally, a point is reached when the iris is fully open where the auto-iris mechanism cannot maintain the level of the video signal at the output of the imager, which needs to be around 1 volt for the luminance part of the composite video signal. At this point, amplifer 28 acts to maintain the video level, by means of an AGC consisting of diode 29, low pass filter 30 and differential amplifier 31, the non-inverting input of which is set to a level of one volt and the inverting input of which is connected to the low pass filter. As the light level falls below the value at which the iris is fully open, the output of the differential amplifier increases and produces an increased gain from amplifier 28. The higher the output of the AGC, the higher the inherent random noise level of the CCD is amplified. The AGC is the noise dominant stage of the CCD imager, and is used to control the noise filter.

Figure 12:
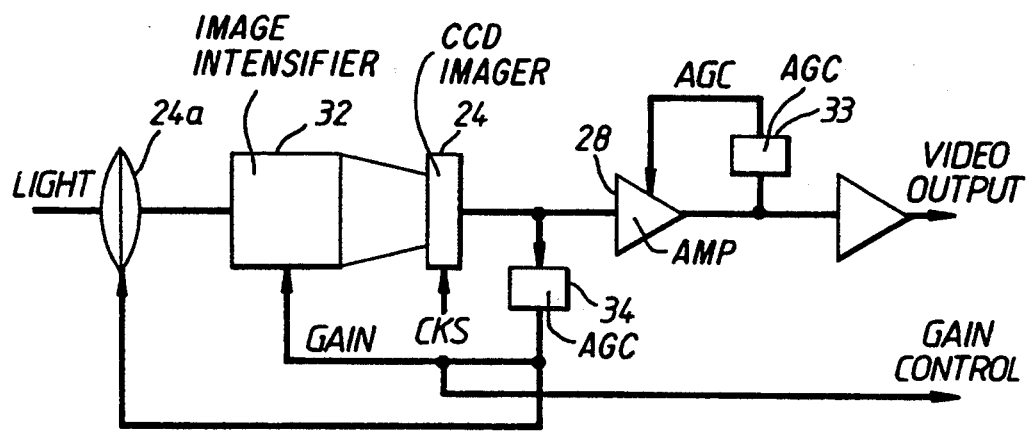

The invention is also applicable to an intensified CCD imager (FIG. 12). This differs from the daylight CCD imager in having an image intensifier (photomultiplier) 32. An auto-iris mechanism is provided as for the daylight CCD imager, but the signal path is shown schematically only. An AGC (block 33) is provided, having components similar to components 29–31 of FIG. 11. In addition, however, there is a feedback path consisting of diode, low pass filter and amplifier (block 34) for automatically setting the gain of the image intensifier. As for the daylight CCD imager, the iris is opened to maintain the level of illumination on the CCD photosensitive areas. However, when the iris is fully open, the gain of the image intensifier is increased to maintain the CCD output. Only when the image intensifier is set at full gain will the AGC compensate for reduced illumination. In this case, the noise from the image intensifier dominates at both high and low gain conditions: the CCD only contributes about 0.5 dB to the overall noise level. The image intensifier gain is used to control the noise filter. However, when the imager intensifier is at full gain, the AGC level is representative of the noise i.e. an increase in the AGC level implies an increase in noise.

The arrangement described is in a closed circuit configuration. However, the invention is not limited to a closed circuit operation. Instead, the gain signal could be encoded on a broadcast video signal waveform e.g. as a digital code during the blanking period between frames, fields or between lines. In this case, the noise reduction circuit in the receiver would have a decoder to decode the noise level code. Further the invention is applicable to colour imagers e.g. CCD imagers (single or multi-sensor) or ICCD colour imagers (three ICCD sensors). Appropriate changes would have to be made to the sampling rates and phases, depending on the colour code used.

Figure 13:
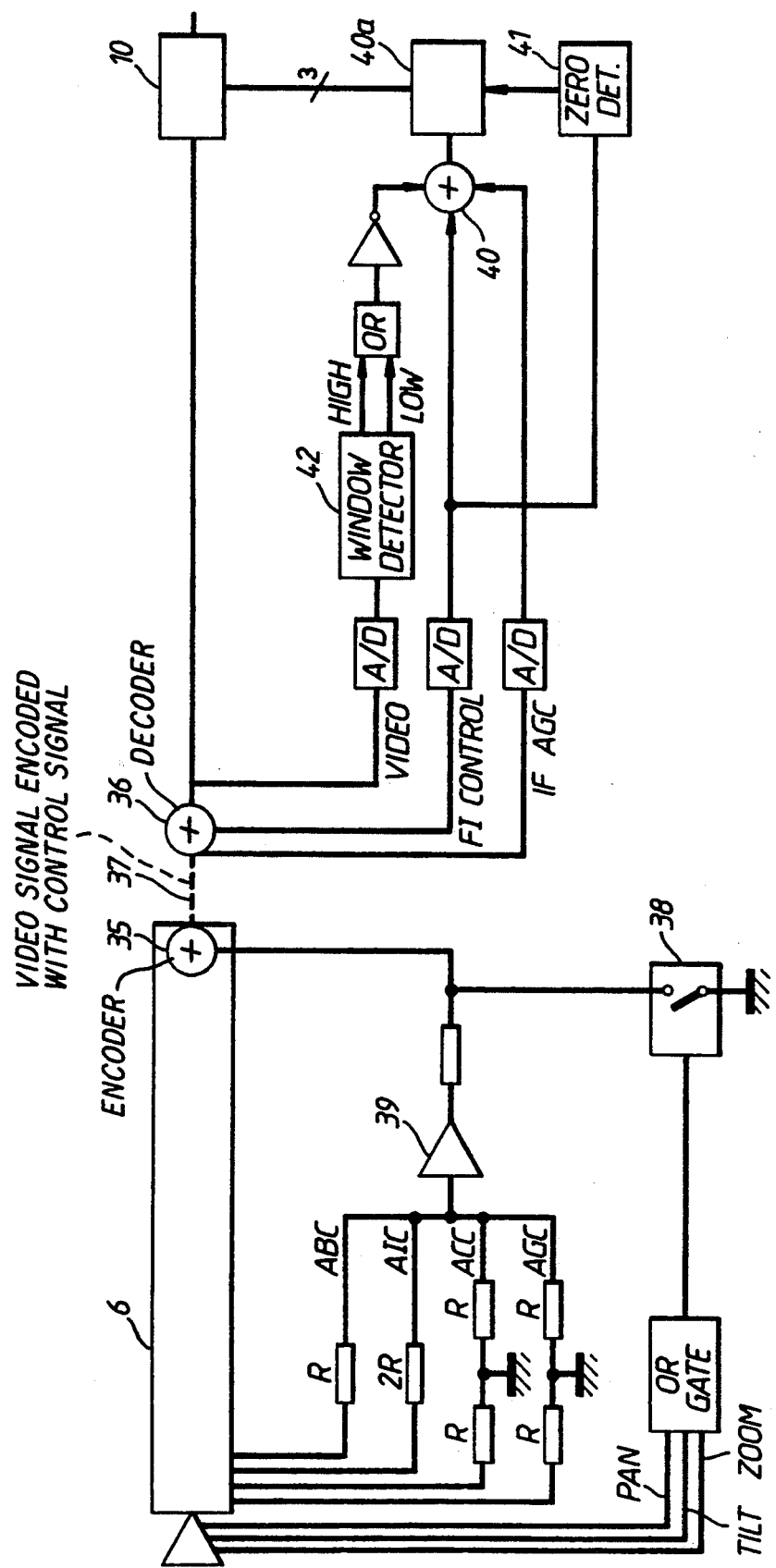
FIG. 13 is a block schematic diagram of a noise reduction circuit of a T.V. receiver which circuit is controlled by several characteristics of a remote imager.

Referring to FIG. 13, the noise reduction may be controlled by the gain of more than one stage and/or other characteristics of the imager, and/or communication path between the imager and noise reduction circuit.

The noise filter 10 is the same as that described above with reference to FIG. 8 except that both the gain and the limit (i.e. the level of signal strength above which noise reduction ceases) are variable, and the shape of the gain characteristic and certain other features are also variable by virtue of the look up table in the PROM 2 (or EPROM).

The frame integrator control signal is combined with the video signal in the imager 6 at combiner or encoder 35 and is separated from the video signal at separator 36. The control signal may be added to the video signal as an analogue signal or as a digital code e.g. during field blanking. The link 37 may be a closed circuit link or an r.f. communication channel.

The frame integrator control signal is forced to zero by the closure of switch 38 in the event of the camera undergoing pan or tilt or zoom.

Because the AGC of the imager, the auto intensifier gain (both as in the FIG. 12 embodiment) and (the case of a colour imager) the automatic chrominance AGC stages control gain in a logarithmic manner, the voltages of these stages may be added at the input of amplifier 39 to give a measure of gain and hence signal-to-noise ratio. A scaling factor of 2:1 is necessary when adding the gain produced by the auto-black or auto-contrast stage, and this is done by choice of resistor R in place of 2R for the other gain signals. (The auto-black stage expands the contrast of the video signal so that the minimum luminance is pulled to black level). The scaling factor is necessary because the signal-to-noise ratio is proportional to the square root of the gain but proportional to the actual contrast itself, not its square root.

In order to take account of the noise if any introduced by the communication link 37 (in the case of a communications link), the frame integrator control signal, after separation from the video signal at separator 36 and digitisation is combined at adder 40 with the AGC of the i.f. stage of the receiver with appropriate scaling. The combined control signal expressed as a digital word on three lines is fed to the noise filter 10.

In the event that the frame integrator control signal separated from the received video signal is held to zero in frame integrator output code generator 40a by the action of the switch 38 indicating panning, tilting or zooming, zero detector 41 holds the control code fed to noise filter 10 to zero, to cancel noise reduction.

A window detector 42 subtracts i.e. reduces the final digital control word if the video is not in the mid-grey region, so that the noise reduction circuit is responsive to grey scale. This is because noise is more noticeable in mid-grey, on a video waveform, than at white or black levels, so that less noise reduction is necessary at white or black levels.

The integrator is driven to balance the level of noise reduction against the motion lag according to the instantaneous T.V. system operating conditions i.e. the limit is set high and the gain (k) is set low in the PROM 2 in the event of poor signal-to-noise ratio but no pan, tilt or zooming, and low with high gain (k) in the event of high signal-to-noise ratio and/or pan, tilt or zooming.

Other characteristics of the filter which may be controlled are slew rate; which may be controlled (reduced) to reduce high level noise spikes without changing the signal amplitude; and high frequency signal bandwith.

I claim:

1. A circuit for the noise reduction of a video signal from an imager means for generating a video signal comprising:
   means for detecting a gain signal from the imager means as encoded on said video signal; and
   means responsive to the detected gain signal for controlling an amount of noise reduction wherein an increase in gain of said imager means increases an output noise of said imager means.

2. A circuit as claimed in claim 1, in which the means for controlling an amount of noise reduction reduces an amount of noise in response to combined gains of two or more stages of said imager means.

3. A circuit as claimed in claim 1, in which the imager includes stages of automatic gain control and automatic contrast control for processing said video signal.

4. A circuit as claimed in claim 1, in which the means for controlling an amount of noise reduction includes a frame or field store connected so that the picture elements in a plurality of successive frames contribute to a reduced noise frame.

5. A circuit as claimed in claim 4, in which the frame or field store is connected in a digital recursive filter.

6. A circuit as claimed in claim 1, in which the means for controlling an amount of noise reduction is responsive to an AGC level of said imager means, where said imager means comprise a thermal imager.

7. A circuit as claimed in claim 1, in which the means for controlling an amount of noise reduction is responsive to an AGC level of said imager means, where said imager means comprise a CCD imager.

8. A circuit as claimed in claim 1, in which the means for controlling an amount of noise reduction is responsive to a detected gain where said gain is an intensifier gain and/or an AGC level of said imager means where said imager means comprise an intensified CCD imager.

9. A circuit for supplying an image signal, comprising:
   an imager supplying a video signal wherein an increase in a gain of said imager produces an increase in an output noise of said imager and wherein a gain of said video signal is encoded on said video signal;
   means for detecting said gain of said imager as encoded on said video signal; and
   means responsive to the detected gain of said video signal for controlling an amount of noise reduction of said video signal supplied by said imager.

10. An imager for generating a video signal comprising:
    amplifer means for amplifying said video signal to supply an amplified video signal; and
    encoder means responsive to a gain of said amplifer means for encoding gain data onto said amplified video signal.

11. A method for the noise reduction of a video signal from an imager, comprising the steps of: detecting a gain value of said imager as encoded on a video signal, and controlling an amount of noise reduction of said video signal in response to the detected gain on the video signal.

12. A circuit as claimed in claim 9 in which the noise reduction means is arranged to reduce the amount of noise dependent on the gain of an r.f. receiver to which the noise reduction circuit is connected.

13. A circuit for noise reduction of a video signal from imager means for generating a video signal comprising:
    means for detecting a gain signal from said imager means as encoded on the video signal, said gain signal representing a gain of a video-signal-amplifying stage of imager means wherein an increase in gain of said imager means produces an increase in an output noise of said imager means; and
    means for controlling an amount of noise reduction in response to the gain signal detected.

14. A circuit as claimed in claim 13, wherein the noise reduction control means is arranged to reduce the amount of noise dependent on the combined gains of two or more video-signal-amplifying stages of said imager means.

15. A circuit as claimed in claim 13, in which the video-signal-amplifying stage includes an automatic gain control circuit and an automatic contrast control circuit.

16. A circuit as claimed in claim 13, in which the means for controlling includes a frame or field store connected so that the picture elements in a plurality of successive frames contribute to a reduced noise frame.

17. A circuit as claimed in claim 16, in which the frame or field store is connected in a digital recursive filter.

18. A circuit as claimed in claim 13, in which noise reduction means is arranged to reduce the noise dependent on an AGC level of said imager means, where said imager means comprise a thermal imager.

19. A circuit as claimed in claim 13, in which the noise reduction means is arranged to reduce the noise dependent on an AGC level of said imager means, where said imager means comprise a CCD imager.

20. A circuit as claimed in claim 13, in which the noise reduction means is arranged to reduce the noise dependent on a detected gain where said detected gain is an intensifier gain and/or an AGC level of said imager means where said imager means comprise an intensified CCD imager.

* * * * *